United States Patent [19]

Tamura

[11] Patent Number: 5,679,722
[45] Date of Patent: Oct. 21, 1997

[54] RESIN COMPOSITION FOR PRODUCTION OF A THREE-DIMENSIONAL OBJECT BY CURING

[75] Inventor: Yorikazu Tamura, Hino, Japan

[73] Assignee: Teijin Seiki Co., Ltd., Osaka, Japan

[21] Appl. No.: 590,496

[22] Filed: Jan. 24, 1996

Related U.S. Application Data

[63] Continuation-in-part of Ser. No. 274,835, Jul. 14, 1994, abandoned.

[30] Foreign Application Priority Data

| Jul. 15, 1993 | [JP] | Japan | 5-196691 |
| Jul. 15, 1993 | [JP] | Japan | 5-196692 |
| Jul. 6, 1994 | [JP] | Japan | 6-176216 |

[51] Int. Cl.$^6$ ............ C08F 2/48; C08K 3/20; C08K 3/34; C08K 3/38
[52] U.S. Cl. ............ 522/96; 522/103; 522/170; 522/186; 523/220
[58] Field of Search ............ 522/96, 103, 170, 522/186; 523/220

[56] References Cited

U.S. PATENT DOCUMENTS

| 3,709,866 | 1/1973 | Waller | 522/96 |
| 4,961,154 | 10/1990 | Pomerantz et al. | 522/96 |
| 5,002,855 | 3/1991 | Fan et al. | 522/2 |
| 5,006,364 | 4/1991 | Fan et al. | 427/44 |

FOREIGN PATENT DOCUMENTS

| 5358 | 1/1983 | Japan | 523/220 |
| 213225 | 9/1986 | Japan | 523/220 |
| 227923 | 11/1987 | Japan | 523/220 |
| 145616 | 6/1990 | Japan . | |

OTHER PUBLICATIONS

J002-145,616, Derwent Abstracts #90-214,469, Derwent, Inc., McLean VA (1990).

*Primary Examiner*—D. R. Wilson
*Attorney, Agent, or Firm*—Michael N. Meller

[57] ABSTRACT

A resin composition for production of a three-dimensional object by curing, which comprises a) a liquid photocurable resin, and b) a reinforcing agent selected from an inorganic solid particle having an average particle diameter of 3 to 70 µm, whisker having an average particle diameter of 0.3 to 1.0 µm, a length of 10 to 70 µm and an aspect ratio of 10 to 100, and a combination of these.

9 Claims, No Drawings

RESIN COMPOSITION FOR PRODUCTION OF A THREE-DIMENSIONAL OBJECT BY CURING

This application is a continuation-in-part of application Ser. No. 08/274,835 filed Jul. 14, 1994, now abandoned.

BACKGROUND OF THE INVENTION

The present invention relates to a resin composition for production of a three-dimensional object by curing, and more particularly, to such a resin composition which shows a low volume shrinkage and excellent dimensional accuracy, physical and mechanical properties and heat resistance, when it has been cured.

A method for production of three-dimensional objects by radiation of active light energy to a photocurable resin has been disclosed in Japanese Patent Application Laid-Open No. 144,478/81. In addition, a basic practical use has been proposed in Japanese Patent Application Laid-Open No. 247,515/85. Thereafter, similar improved techniques have been disclosed in Japanese Patent Application Laid-open Nos. 35,966/87; 204,915/89; 113,925/90; 145,616/90; 153,722/90; 15,520/91; 21,432/91; 41,126/91 and the like.

A typical example of methods for production of three-dimensional objects by photocuring comprises selectively irradiating a liquid surface of a liquid photocurable resin accommodated in a container with an ultraviolet laser controlled by a computer to cure the liquid photocurable resin so as to provide a desired pattern, newly supplying a liquid resin in an amount corresponding to one layer onto the cured layer, irradiating the newly supplied liquid resin with an ultraviolet laser in a similar manner to cure it, and repeating such processes for forming continuous cured layers, thereby building a final three-dimensional object.

These approaches relate to the formation of solid sectors of three-dimensional objects by sequential irradiation of areas or volumes sought to be solidified.

These techniques are described as well as the use of direct laser writing, i.e., exposing a photocurable polymer with a UV laser beam according to a desired pattern and building a three-dimensional model layer by layer.

Recently, this method for production of a three-dimensional object attracts much attention, because it easily gives a considerably complicated shape in a relatively short time.

The photocurable resins for the conventional method for production of a three-dimensional object or article by photocuring include modified polyurethane(meth)acrylate, oligoester acrylate, urethane acrylate, epoxy acrylate, photosensitive polyimide, aminoalkyd resins and the like. Recently, a variety of improved materials have been disclosed in Japanese Patent Application Laid-Open Nos. 204,915/89; 213,304/89; 28,261/90; 75,617/90; 145,616/90; 104,626/91; 114,732/91; 114,733/91 abd the like.

In such methods for production of three-dimensional objects by photocuring, a photocurable resin requires not only a relatively low viscosity from viewpoints of a handleability, a processing speed, an object accuracy and the like, a volume shrinkage from a viewpoint of a dimensional accuracy of a formed article with high mechanical properties, but also with a high heat resistance depending upon an application.

However, all of the prior art liquid photocurable resins which have been provided heretofore are necessarily not satisfactory particularly in dimensional accuracy.

Therefore, the present inventor has made zealous efforts to improve the above-described properties. As a result, he has found that appropriate particles and/or whiskers of inorganic materials incorporated into a liquid photocurable resin give not only an enhanced mechanical rigidity, but also a reduced volume shrinakge. Thus, the present invention has been accomplished.

SUMMARY OF THE INVENTION

Accordingly, the first object of the present invention is to provide a resin composition for production of a three-dimensional object by curing, with a viscosity suitable for processing.

The second object of the present invention is to provide a resin composition to afford a cured three-dimensional object having sufficiently high mechanical properties and a low volume shrinkage.

The third object of the present invention is to provide a resin composition to afford a cured three-dimensional oject having an excellent dimensional accuracy.

The fourth object of the present invention is to provide a resin composition for production of a three-dimensional articles by photocuring, which composition has a viscosity suitable for processing with a stable and homogeneous liquid for a long time, and from which a three-dimensional articles with sufficiently high mechanical properties and an excellent heat resistance and therefore with an excellent dimensional accuracy can be produced.

The other objects and advantages of the present invention will be apparent from the following descriptions.

According to the present invention, the above objects and advantages can be accomplished by, firstly, a resin composition (to be referred to as "first resin composition" hereinafer) for production of a three-dimensional object by curing, which comprises a) a liquid photocurable resin, and b) a reinforcing agent of an inorganic solid particle having an average particle diameter of 3 to 70 μm, said inorganic solid particle being incorporated in an amount of 5 to 70% by volume based on the total volume of the components a) and b).

Secondly, according to the present invention, the above objects and advantages can be accomplished by a resin composition (to be referred to as "second resin composition" hereinafter) for the production of a three-dimensional object by curing, which comprises:

a) a liquid photocurable resin; and b) a reinforcing agent of whiskers having an average diameter of 0.3 to 1.0 μm, a length of 10 to 70 μm and an aspect ratio of 10 to 100, said whiskers being incorporated in an amount of 5 to 30% by volume based on the total volume of the components a) and b).

Thirdly, according to the present invention, the above objects and advantages can be accomplished by a resin composition (to be referred to as "third resin composition" hereinafter) for the production of a three-dimensional object by curing, which comprises:

a) a liquid photocurable resin; and b) a reinforcing agent of a combination of an inorganic solid particle having an average particle diameter of 3 to 70 μm, and whiskers having an average diameter of 0.3 to 1.0 μm, a length of 10 to 70 μm and an aspect ratio of 10 to 100, said reinforcing agent being incorporated in an amount of 5 to 70% by volume based on the total volume of the components a) and b).

DETAILED DESCRIPTION OF THE INVENTION

As an unsaturated compound for the liquid photocurable resin used in the present invention, a polymerizable vinyl compound and an epoxy compound are preferably used.

The unsaturated compound may be either monofunctional or polyfunctional and either a monomer or an oligomer.

Illustrative examples of the oligomer include monofunctional and polyfunctional urethane acrylate oligomers, epoxy acrylate oligomers and ester acrylate oligomers.

Illustrative examples of the monofunctional monomer include acrylic compounds such as isobornyl acrylate, isobornyl methacrylate, dicyclopentenyl acrylate, dicyclopentenyloxyethyl acrylate, dicyclopentenyloxyethyl methacrylate, dicyclopetanyl acrylate, dicyclopetanyl methacrylate, bornyl acrylate, bornyl methacrylate, 2-hydroxyethyl acrylate, cyclohexyl acrylate, 2-hydroxypropyl acrylate, morpholine acrylamide, morpholine methacrylamide and phenoxyethyl acrylate; and other monofunctional vinyl monomers such as N-vinyl pyrrolidone, N-vinyl caprolactam, acrylamide, vinyl acetate and styrene.

Illustrative examples of the polyfunctional monomer include trimethylolpropane triacrylate, ethylene-oxide modified trimethylolpropane triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, dicyclopentanyl diacrylate, polyester diacrylate, ethylene-oxide modified bisphenol A diacrylate, pentaerythritol triacrylate, pentaerythritol tetraacrylate, propylene-oxide modified trimethylolpropane triacrylate, propylene-oxide modified bisphenol A diacrylate, tris(acryloxyethyl)isocyanurate and the like.

Further, illustrative examples of the epoxy compound include hydrogenated bisphenol A diglycidyl ether, 3,4-epoxycyclohexylmethyl-3,4-epoxycyclohexane carboxylate, 2-(3,4-epoxycyclohexyl-5,5-spiro-3,4-epoxy) cyclohexanemetha-dioxane, bis(3,4-epoxycyclohexylmethyl)adipate and the like.

These unsaturated compounds may be used alone or in combination of two or more.

The liquid photocurable resin may contain a photopolymerization initiator or a thermal polymerization initiator in addition to the unsaturated compound.

Typical examples of the photopolymerization initiator include 2,2-dimethoxy-2-phenyl acetophenone, 1-hydroxycyclohexylphenyl ketone, acetophenone, benzophenone, xanthone, fluorenone, benzaldehyde, fluorene, anthraquinone, triphenylamine, carbazole, 3-methyl acetophenone, Michler's ketone and the like. These initiators may be used alone or in combination of two or more. Further, they can be used in combination with an sensitizer such as an amine compound as required.

Typical examples of the thermal polymerization initiator include benzoyl peroxide, t-butyl peroxybenzoate, dicumyl peroxide, diisopropyl peroxydicarbonate, t-butyl peroxide, azobisisobutyronitrile and the like.

When an epoxy compound is used, an energy active cation initiator such as triphenyl sulfonium hexafluoroantimonate may be used advantageously.

The resin composition of the present invention comprises either an inorganic solid particle or whiskers, or both, as a reinforcing agent.

The inorganic solid particle needs to have an average particle diameter of 3 to 70 μm. If the average particle diameter is less than 3 μm, the viscosity of the resin composition becomes too high, thereby making it difficult not only to blend a predetermined amount of the inorganic solid particles but also to handle during optical shaping. If the average particle diameter is more than 70 μm, though an increase in the viscosity of the resin composition is not so large, the diffusion of irradiation energy (light, for example) for curing occurs, thereby not only deteriorating shaping accuracy but also leading to a reduction in the accuracy of a shaped article due to restriction on the film thickness of each layer to be laminated, both of which are not preferred.

The average particle diameter of the inorganic solid particle is preferably in the range of 10 to 60 μm, more preferably 15 to 50 μm. When the average particle diameter is within the above range, a resin composition having good balance between shapability and accuracy can be obtained depending on the proportion of a reinforcing agent.

The inorganic solid particle is used in the first resin composition in an amount of 5 to 70% by volume based on the total volume of the liquid curable resin and the inorganic solid particle.

If the proportion of the inorganic solid particle is less than 5% by volume, the characteristic properties of the inorganic solid particle are not developed fully. Particularly, a three-dimensional object obtained by curing the resin composition does not meet requirements for the mechanical properties of a simple mold and hence, is not put to use. If the proportion is more than 70% by volume, the average particle diameter of the inorganic solid particle usable is limited and the viscosity of the resulting resin composition is extremely high, thereby making it difficult to use it for shaping.

The proportion of the inorganic solid particle in the first resin composition is preferably 20 to 65% by volume, more preferably 30 to 60% by volume. This range is advantageously used to achieve shapability and the characteristic properties of a simple mold.

Although the inorganic solid particle used in the present invention may be transparent or opaque, it is preferably spherical in shape, more preferably exactly spherical. When the inorganic solid particle is not spherical, the irregular reflection of irradiation energy (light, for example) occurs and the accuracy of a three-dimensional object obtained by curing the resin composition may be lost. In addition, the viscosity of the resin composition tends to increase. As for the sphericity of the inorganic solid particle, it is desired to use an inorganic solid particle which has a relative standard deviation defined by the following formula of less than 0.5.

relative standard deviation=

$$\text{relative standard deviation} = \sqrt{\frac{\sum_{i=1}^{n}(D_i - \overline{D})^2}{n}} \Big/ \overline{D}$$

wherein $D_i$ (μm) is a diameter of the area circle of each particle, $\overline{D}$ (μm) is an average value of the diameter of the area circle defined by the following formula $$\overline{D} = \sum_{i=1}^{n} D_i/n$$

and n is the number of particles.

Preferred examples of the inorganic solid particle include a glass particle (bead), talc particle and silica particle. They may be used alone or in combination of two or more.

The inorganic solid particle treated with a silane coupling agent can be used preferably. Preferred examples of the silane coupling agent include amino silane, epoxy silane, vinyl silane, acryl silane and the like.

Specific examples of the amino silane coupling agent include γ-aminopropyltriethoxysilane, N-β(aminoethyl)γ-aminopropyltrimethoxysilane and N-β(aminoethyl)γ-aminopropylmethyldimethoxysilane.

Specific examples of the epoxy silane coupling agent include β-(3,4-epoxycyclohexyl)ethyltrimethoxysilane and γ-glycidoxypropyltrimethoxysilane.

Specific examples of the vinyl silane coupling agent include vinyl trichlorosilane, vinyltriethoxysilane and vinyltris(βmethoxyethoxysilane).

Specific examples of the acryl silane coupling agen include trimethoxysilanemethacrylate.

When the inorganic solid particle treated with such a silane coupling agent is used, a cured product having greatly improved mechanical strength, in particular, is obtained from the resulting resin composition. The silane coupling agent develops different degrees of curability depending on a liquid photocurable resin used. For instance, when an unsaturated vinyl compound is used as the liquid photocurable resin, an inorganic solid particle treated with an acryl silane coupling agent is preferably used, and, when an epoxy compound is used, an inorganic solid particle treated with an epoxy silane coupling agent is preferably used.

The resin composition of the present invention can use whisker as a reinforcing agent in place of or in combination with the inorganic solid particle.

The whiskers used in the present invention needs to have an average diameter of 0.3 to 1.0 μm, a length of 10 to 70 μm and an aspect ratio of 10 to 100.

The preferable average diameter is 0.3 to 0.7 μm, the preferable length is 20 to 50 μm and the preferable aspect ratio is 20 to 70.

If the aspect ratio of whiskers in use is less than 10, the effects of improving the mechanical strength and reducing the volume shrinkage of the resulting cured product cannot be obtained, and the viscosity of the resin composition increases disadvantageously. If the aspect ratio of whiskers is large, the effects of improving the mechanical strength and reducing the volume shrinkage of the resulting cured product are expected. However, if the aspect ratio is too large, the viscosity and fluid elasticity of the resin composition become high, resulting in a difficult shaping operation, a large length of the whiskers and deteriorated accuracy of the side surface of the resulting cured product.

The whiskers are used in the second resin composition in an amount of 5 to 30% by volume based on the total volume of the liquid photocurable resin and the whiskers.

If the proportion of the whiskers is less than 5% by volume, the characteristic properties of the whiskers are not developed fully, and a three-dimensional object obtained by curing the resin composition does not exhibit sufficient mechanical strength. If the proportion is more than 30% by volume, the viscosity of the resulting resin composition becomes extremely high, thereby making it difficult to use it for shaping.

As to the whiskers, what have been treated with a silane coupling agent can be used preferably.

Illustrative examples of the silane coupling agent are the same as those provided in connection with the inorganic solid particle.

Preferred examples of the whiskers include whiskers of aluminum borate and derivatives thereof, whiskers of hydroxy magnesium sulfate and derivatives thereof, whiskers of aluminum oxide and whiskers of silicon oxide. They may be used alone or in combination of two or more.

When the resin composition (third resin composition) of the present invention comprises a combination of an inorganic solid particle and whiskers as a reinforcing agent, the reinforcing agent is used in an amount of 5 to 70% by volume based on the total volume of the liquid curable resin and the reinforcing agent.

Illustrative examples of the inorganic solid particle and the whiskers are the same as those provided hereinbefore.

Since the third resin composition comprises a combination of an inorganic solid particle and whiskers as a reinforcing agent, the mechanical properties and heat resistance of the resulting cured product are significantly improved and the volume shrinkage of the product is greatly reduced by the synergism of the inorganic solid particle and whiskers.

The ratio of the volume amount of the inorganic solid particle to the volume amount of the whiskers is preferably between 7:3 and 1:1.

Within this range of the ratio, it is more preferred to set the proportion of the inorganic solid particle to 5 to 65% by volume, that of the whisker to 5 to 30% by volume and the total of both to 10 to 70% by volume. It is the most preferred to set the proportion of the inorganic solid particle to 10 to 50% by volume, that of the whiskers to 5 to 20% by volume and the total of both to 20 to 60% by volume.

Each of the resin composition of the present invention has an excellent feature that it has an extremely small volume shrinkage when it is converted into a cured product. The volume shrinkage factor is preferably 5% or less, particularly preferably 3% or less. The third resin composition having a volume shrinkage of 3% can be easily obtained.

The liquid photocurable resin composition used in the present invention may contain a leveling agent, surfactant, organic polymer compound, organic plasticizer, organic filler other than those provided hereinbefore, inorganic filler other than those provided hereinbefore, and the like as required.

Preferred examples of the organic filler include organic polymer solid particles having an average particle diameter of 3 to 70 μm, such as crosslinked polystyrene polymer particles, crosslinked polymethacrylate polymer particles, polyethylene polymer particles and polypropylene polymer particles. The total amount of the organic filler and the inorganic solid particle is 70% by volume based on the resin composition.

A method for producing a three-dimensional object such as an optically shaped article from the resin composition of the present invention comprises the steps of: producing data representing the sections of a three-dimensional object to be formed, forming a layer of the resin composition of the present invention on a working surface designated to be exposed to light for curing generated based the data, exposing the layer to light for curing to form a first sectional layer, applying the resin composition of the present invention to this first sectional layer, and exposing the resin composition to light for curing to form a second sectional layer and bonding together the first sectional layer and the second sectional layer at the same time. These operations are repeated several times to produce a desired three-dimensional object.

To further illustrate this invention, and not by way of limitation, the following examples are given.

In the present invention, the average particle diameter of the inorganic solid particle and the average diameter and length of the whiskers were measured in accordance with the following methods.

Measurement of the averaege particle diameter of inorganic solid particle

Particles are scattered over the sample holder of an electron microscope in such a manner that they are not overlapped with each other, and a gold deposit thin layer having a thickness of 200 to 300 Å is formed on the surface of each particle and measured with a scanning electron microscope at a magnification of 10,000 to 30,000. The diameters of the area circles of at least 100 particles are obtained with the Luzex 500 manufactured by Nippon Regulator Co.

Measurement of the average diameter and length of whiskers

% particle diameters D10 and D90 are obtained using ion exchange water as a dispersion medium and a laser diffraction/scattering type particle size distribution measuring instrument (LA-700 manufactured by Horiba Seisakusho). D10 is taken as a fiber diameter and D90 is taken as a fiver length. The aspect ratio is obtained from D90/D10.

acrylate oligomer was removed from the flask while the contents were warm. The IR and elemental analysis of the produced urethane acrylate oligomer showed that it had a structure represented by the following formula (I):

Formula (I):

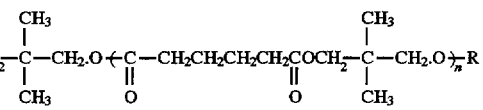

wherein n is an integer (an average value of 4), and R represents a following radical:

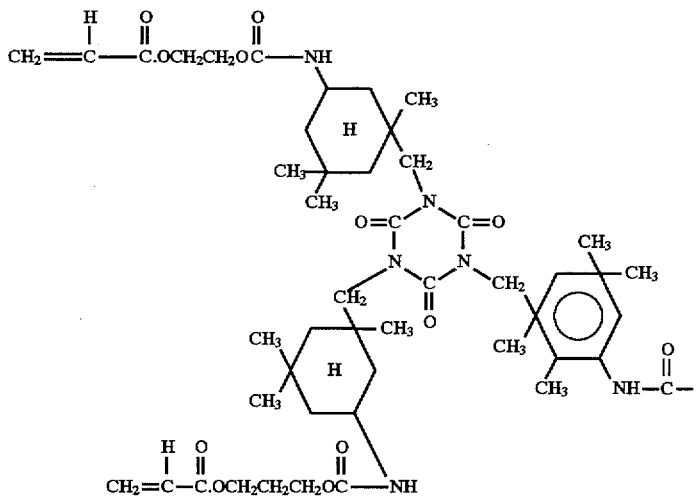

PREPARATION EXAMPLES (Preparation of urethane acrylate oligomer)

Into a 5 liter three-necked flask equipped with a stirrer, a condenser and a dropping funnel having a bypass, 1,023 g of IPDI terpolymer (made by Sumitomo Bayer Co., Corp. and supplied under a trade name of Dismodule Z-4372) produced by trimerization of isophorone diisocyanate and 0.076 g of dibutyl tin-laurate were charged. They were heated in an oil bath into an internal temperature of 65° C. within the flask. 420.1 Grams of polyneopentyl adipate (made by Asahi Denka Co. and supplied under a trade name of Adeka Newace Y9-10) was placed into the dropping funnel and previously kept warm at 50° C. The entire inside of the system was repeatedly evacuated and supplied with nitrogen gas back into ambient pressure, so that it was purged with the nitrogen gas. After returning to ambient pressure, the polyneopentyl adipate was dropped into the flask from the dropping funnel over one hour, while maintaining the temperature of the contents of the flask in the nitrogen atmosphere at 65° C. under stirring. After completion of the dropping, the reaction mixture was maintained at 65° C. for further one hour to continue the reaction under stirring.

The reaction mixture in the flask were cooled to 50° C. Then, a homogeneous solution of 0.90 g of methyl hydroquinone and 254.5 g of 2-hydroxyethyl acrylate was placed into the dropping funnel and promptly added at a temperature below 55° C. Then, the resulting mixture was stirred for two hours to continue the reaction. A produced urethane

EXAMPLE 1

(Preparation of photocurable composition)

Into a 5 liter three-necked flask equipped with a stirrer, a condenser and a dropping funnel, there were charged 1,320 g of the urethane acrylate prepared in Preparation Example, 1,080 g of polyethylene glycol 200 diacrylate (made by Somal Co. and sold under a trade name of Sertomer SR259) and 480 g of ethylene oxide-modified trimethylol propane triacrylate (made by Somal Co. and sold under a trade name of Sortomer SR454). The mixture was evacuated and supplied with nitrogen gas, so that it was purged with the nitrogen gas. The contents were heated to 50° C. and stirred and mixed for about one hour.

120 Grams of 2,2-dimethoxy-2-phenyl acetophenone (made by Ciba Geigy A. G. and sold under a trade name of Irugacure 651) was added into the mixture and stirred in an environment cut off from ultraviolet rays, until it was completely dissolved. Added into a resulting resin composition were 14 g of Superdyne V201 (made by Takemoto Oils and Fats Co.) as a leveling agent and 6,420 g (corresponding to 50% by volume based on a resin composition) of glass beads having an average particle diameter of 30 μm resulting from the treatment with an acrylic silane coupling agent. A mixture was stirred and deaerated at room temperature for a day. The viscosity of the mixture was of 14,000 cps at 25° C.

Focused Ar laser beam (having an output power of 500 mW and a wavelength of 368 μm) was perpendicularly introduced to the surface of the photocurable resin composition prepared in the above manner to provide a predetermined dumbbell-like rectangle of 4.0 mm×10.0 mm×130 mm. The liquid resin sticked to the solidified test piece was removed by isopropyl alcohol, followed by a post-curing for 10 minutes with ultraviolet rays of 3 KW. Tensile and flexural characteristics of the obtained zest piece were measured according to JIS Standard 6911, and a thermal distortion temperature was measured according to JIS Standard 7207. Further, a volume shrinkage was determined by measuring a specific gravity of the liquid resin and a specific gravity of the solidified article. The results are given in Table 1 below.

Comparative Example 1

Into a 5 liter three-necked flask equipped with a stirrer, a condenser and a dropping funnel having a bypass, there were charged 1,320 g of the urethane acrylate prepared in Preparation Example, 1,080 g of polyethylene glycol 200 diacrylate and 480 g of ethylene oxide-modified trimethylol propane triacrylate. The mixture was purged with the nitrogen gas. The mixture was heated to 50° C. and stirred for about one hour.

120 Grams of 2,2-dimethoxy-2-phenyl acetophenone was added to the mixture in an environment cut off from ultraviolet rays and then mixed into a homogeneous mixture. The viscosity of the resin composition was of 1,550 cps at 25° C. Then, a test piece was fabricated from the photocurable resin composition in the same manner as in Example 1, and the various physical and mechanical properties thereof were measured. The results are shown in Table 1 below.

EXAMPLE 2

In place of the glass beads used in Example 1, glass beads resulting from the treatment with an aminosilane coupling agent was used to prepare a photocurable resin composition in the same manner as in Example 1. In addition, a test piece was fabricated in the same manner as in Example 1, and the physical and mechanical properties were likewise measured. The results are shown in Table 1 below.

EXAMPLE 3

A photocurable resin composition was prepared in the same manner as in Example 1, except that the glass beads having an average particle diameter of 15 μm and resulting from the treatment with an aminosilane coupling agent was used in place of the glass beads used in Example 1. The viscosity of the photocurable resin composition was of 26,000 cps at 25° C. A test piece was fabricated in the same manner as in Example 1, and the physical and mechanical properties were likewise measured. The results are given in Table 1 below.

EXAMPLE 4

A photocurable resin composition was prepared in the same manner as in Example 1, except that the glass beads having an average particle diameter of 15 μm without treatment by an aminosilane coupling agent was used in place of the glass beads used in Example 1. The viscosity of the photocurable resin composition was of 25,000 cps at 25° C. A test piece was fabricated in the same manner as in Example 3, and the physical and mechanical properties were likewise measured. The results are given in Table 1 below.

EXAMPLE 5

A photocurable resin composition was prepared in the same manner as in Example 1, except that the amount of the Superdyne V201 as the leveling agent and the amount of the glass beads having an average particle diameter of 30 μm and resulting from the treatment with the acrylic silane coupling agent as used in Example 1 were changed to 7 g and 714 g (corresponding to 10% by volume based on the resin composition), respectively. Then the same stirring and deaeration as in Example 1 were conducted at room temperature for a day. The viscosity of the photocurable resin composition was of 1,700 cps at 25° C. A test piece was fabricated in the same manner as in Example 1, and the physical and mechanical properties were likewise measured. The results are given in Table 1 below.

Comparative Example 2

An attempt was made to prepare a photocurable resin composition in the same manner as in Example 1, except that polystyrene beads having an average particle diameter of 6 μm was used in an amount of 7,075 g (corresponding to 75% by volume based on the resin composition) in place of the glass beads having an average particle diameter of 30 μm used in Example 1. However, this resin composition had a non-fluidity and could not be afforded as a photocurable resin composition according to the present invention.

Comparative Example 3

A resin composition was prepared in the same manner as in Comparative Example 1, except that 396 g of the urethane acrylate prepared in Preparation Example, 324 g of Sertomer SR259 and 144 g of Sertomer SR454 were used. 57 Grams of Superdyne V201 was added to the resin composition and further 5,781 g (corresponding to 75% by volume based on the resin composition) of glass beads having an average particle diameter of 30 μm was added.

This resin composition showed a poor fluidity and a viscosity of more than 300,000 cps. A test piece was fabricated in the same manner as in Example 1, and the physical and mechanical properties were measured. The results are given in Table 1 below.

TABLE 1

| Example No. | Tensile strength (kg/mm$^2$) | Tensile modulus (kg/mm$^2$) | Flexural strength (kg/mm$^2$) | Flexural modulus (kg/mm$^2$) | Volume shrinkage (%) |
| --- | --- | --- | --- | --- | --- |
| 1 | 3.9 | 594 | 5.8 | 690 | 3.0 |
| Comp. Ex. 1 | 3.9 | 135 | 5.0 | 140 | 6.5 |
| 2 | 1.1 | 133 | 2.6 | 472 | 3.3 |
| 3 | 2.8 | 475 | 5.0 | 618 | 3.4 |
| 4 | 1.0 | 267 | 2.5 | 422 | 3.0 |
| 5 | 4.1 | 268 | 5.5 | 322 | 5.5 |
| Comp. Ex. 2 | — | — | — | — | — |
| Comp. Ex. 3 | 0.1 | 425 | 0.3 | 430 | — |

Comp. Ex. = Comparative Example

Comp. Ex.=Comparative Example

As apparent from Table 1, it can be easily understood that the volume shrinkage about each of the photocurable resin compositions in Examples of the present invention is very much reduced as compared with that in Comparative Example 1. In addition, the tensile modulus and the flexural modulus of the photocured test pieces in Examples of the present invention are also enhanced.

It can be seen that the volume shrinkage was larger, resulting in a poor dimensional accuracy in Comparative Example 1, and when the polyethylene beads was used in the amount of 75% by volume based on the resin composition beyond the range of amounts defined in the present invention, as in Comparative Example 2, the resin mixture showed no fluidity and was failed to build a three-dimensional article by photocuring. Further, the resin composition in Comparative Example 3 was smaller in both of tensile strength and flexural strength and hence, poor in practical use.

EXAMPLE 6

A photocurable resin composition was produced in the same manner as in Example 1, except that 1,360 g (corresponding to 15% by volume based on the resin composition) of aluminum borate whiskers (having a diameter of 0.5 to 0.7 μm and an aspect ratio of 50 to 70, and made by Shikoku Kasei Industries Co. and sold under a trade name of Arbolex YS-4) resulting from the treatment with an acrylic silane coupling agent was used in place of the glass beads used in Example 1. The viscosity of the photocurable resin composition was of 10,600 cps at 25° C.

A test piece was fabricated in the same manner as in Example 1. Tensile and flexural characteristics of the test piece were measured in the same manner as in Example 1. The results are given in Table 2 below.

EXAMPLE 7

A photocurable resin composition was prepared in the same manner as in Example 6, except that Arbolex YS-1 (made by Shikoku Kasei Industries Co.), i.e., aluminum borate whiskers resulting from the treatment with a silane coupling agent was used in place of the Arbolex YS-4 used in Example 6. A test piece was fabricated in the same manner as in Example 6, and the physical and mechanical properties were measured. The results are given in Table 2 below.

EXAMPLE 8

A photocurable resin composition was prepared in the same manner as in Example 6, except that Arbolex Y (made by Shikoku Kasei Industries Co.), i.e., aluminum borate whiskers without the treatment with a silane coupling agent was used in place of the Arbolex YS-4 used in Example 6. A test piece was fabricated in the same manner as in Example 6, and the physical and mechanical properties were measured. The results are given in Table 2 below.

EXAMPLE 9

A photocurable resin composition was prepared in the same manner as in Example 1, except that 5,120 g of the same glass beads as in Example 1 (corresponding to 40% by volume based on the resin composition) and 1,536 g of the same whiskers as in Example 6 (corresponding to 10% by volume based on the resin composition) were used in place of the glass beads used in Example 1. The viscosity of the resin composition was of 40,000 cps at 25° C. A portion of this photocurable composition was sampled into a test tube, and the stability of the photocurable resin was examined. The results showed that the resin was maintained stable and homogeneous for about 5 days. A test piece was fabricated in the same manner as in Example 1. Physical and mechanical properties of the test piece were measured according to JIS Standard 6911. The results are given in Table 2 below.

EXAMPLE 10

A photocurable resin composition was prepared in the same manner as in Example 9, except that 2,253 g (corresponding to 40% by volume) of crosslinked polystyrene beads having an average particle size of 15 μm and resulting from the treatment with an acrylic silane coupling agent was used in place of the glass beads used in Example 9. The viscosity of the photocurable resin composition was of 48,000 cps at 25° C. A test piece was fabricated in the same manner as in Example 1, and the physical and mechanical properties were measured. The results are given in Table 2 below.

Comparative Example 4

A photocurable resin composition was prepared in the same manner as in Example 6, except that the amount of the Arbolex YS-4 used in Example 6 was changed to 320 g (corresponding to 4% by volume). The viscosity of the photocurable resin composition was of 2,300 cps at 25° C. A test piece was fabricated in the same manner as in Example 6, and the physical and mechanical properties were measured. The results are given in Table 2 below.

Comparative Example 5

An attempt was made to prepare a photocurable resin composition in the same manner as in Example 6, except that the amount of the Arbolex YS-4 used in Comparative Example 4 was changed to 4,150 g (corresponding to 35% by volume based on the resin composition). The viscosity of the resin composition was of 43,000 cps at 25° C. However, as a result of fabrication of a test piece from this resin composition, the depth of penetration was not sufficient, and delamination was observed. Thus, it was failed to measure physical and mechanical properties of this test piece.

Comparative Example 6

A photocurable resin composition was prepared in the same manner as in Example 6, except that 1,133 g (corresponding to 4% by volume) of silicon oxide whiskers having an aspect ratio of 3 was used in place of the Arbolex YS-4 used in Example 6.

The viscosity of the photocurable resin composition was of 6,500 cps at 25° C. A test piece was fabricated in the same manner as in Example 6, and the physical and mechanical properties were measured. The results are given in Table 2 below.

Comparative Example 7

A liquid resin composition was prepared in the same manner as in Example 6, except that a silicon oxide whiskers having an aspect ratio of 150 was used in place of the silicon oxide whiskers having an aspect ratio of 3 and used in Comparative Example 6. A test piece was fabricated in the same manner as in Example 6. Many whisker-like portions were observed on the side surfaces of the test piece.

TABLE 2

| Example No. | Tensile strength (kg/mm$^2$) | Tensile modulus (kg/mm$^2$) | Flexural strength (kg/mm$^2$) | Flexural modulus (kg/mm$^2$) | Heat distortion temp. (°C.) | Volume shrinkage (%) |
|---|---|---|---|---|---|---|
| 6 | 6.5 | 769 | 8.7 | 840 | 63 | 3.5 |
| Comp. Ex. 1 | 3.9 | 135 | 5.0 | 140 | 53 | 6.5 |
| 7 | 4.5 | 669 | 6.7 | 640 | 56 | 4.3 |
| 8 | 3.7 | 433 | 5.8 | 618 | 53 | 4.8 |
| Comp. Ex. 4 | 3.8 | 165 | 5.1 | 190 | 53 | 6.3 |
| Comp. Ex. 5 | — | — | — | — | — | — |
| Comp. Ex. 6 | 3.1 | 225 | 4.3 | 230 | 53 | 5.3 |
| Comp. Ex. 7 | — | — | — | — | — | — |
| 9 | 3.7 | 533 | 6.0 | 692 | 54 | 1.8 |
| 10 | 3.9 | 316 | 4.3 | 354 | 53 | 2.0 |

Comp. Ex. = Comparative Example

As apparent from Table 2, it can be seen that the tensile strength, the tensile modulus and the heat distortion temperature of the object made in each of Examples of the present invention are enhanced considerably, and the volume shrinkage is very much reduced, as compared with that in Comparative Example 1.

It can be also seen that the object made using the beads in combination with the whiskers, as in Examples 9 and 10, shows a very small volume shrinkage and is excellent in practical use.

In Comparative Example 1 or 4, a large volume shrinkage and a poor dimensional accuracy were observed, and the other physical and mechanical properties were less varied.

Further, in Comparative Example 6, the aspect ratio of 3 is out of the scope of the present invention, and the physical and mechanical properties are poor, as compared with those in the present invention.

What we claimed is:

1. A resin composition for production of a three-dimensional object by curing, which comprises
   a) a liquid photocurable resin, said liquid photocurable resin being formed from at least one unsaturated compound selected from the group consisting of an ethylenically unsaturated compound and an epoxy compound, and
   b) a reinforcing agent which is a combination of an inorganic solid particle having a number average particle diameter of 3 to 70 µm, and whiskers having a number average particle diameter of 0.3 to 1.0 µm, a length of 10 to 70 µm, and an aspect ratio of 10 to 100, said reinforcing agent being incorporated in an amount of 5 to 70% by volume based on the total volume of the components a) and b).

2. The resin composition of claim 1, wherein the inorganic solid particles is at least one particle selected from the group consisting of glass particle, talc particle and silica particle.

3. The resin composition of claim 1, wherein the average particle diameter of the inorganic solid particle is from 10 to 60 µm.

4. The resin composition of claim 1, wherein the inorganic solid particle has a relative standard deviation defined by the following formula:

relative standard deviation=

$$\text{relative standard deviation} = \sqrt{\frac{\sum_{i=1}^{n}(D_i - \overline{D})^2}{n}} \bigg/ \overline{D}$$

wherein $D_i$ (µm) is a diameter of the area circle of each particle, $\overline{D}$ (µm) is an average value of the diameter of the area circle defined by the following formula $$\overline{D} = \sum_{i=1}^{n} D_i/n$$

and n is the number of particles, of less than 0.5.

5. The resin composition of claim 1, wherein the whiskers are at least one member selected from the group consisting of whiskers of aluminum borate hydroxy magnesium sulfate, aluminum oxide and silicon oxide.

6. The composition of claim 1, wherein the whiskers have an aspect ratio of 20 to 70.

7. The resin composition of claim 1, wherein a ratio of the volume amount of the inorganic solid particle to the volume amount of the whisker is between 7:3 to 1:1.

8. The resin composition of claim 1, which has a volume shrinkage of 3% or less.

9. The resin composition of claim 1, wherein the ethylenically unsaturated compound is a urethane acrylate monomer or oligomer.

* * * * *